US009868250B2

(12) United States Patent
Beuer et al.

(10) Patent No.: US 9,868,250 B2
(45) Date of Patent: Jan. 16, 2018

(54) PROCESS FOR THE ADHESIVE BONDING OF PLASTICS PIPES BY MEANS OF (METH)ACRYLATE ADHESIVE

(71) Applicants: Henkel AG & Co. KGaA, Duesseldorf (DE); Henkel IP & Holding GmbH, Duesseldorf (DE)

(72) Inventors: Bernd Beuer, Monheim (DE); Bernhard Schoettmer, Monheim (DE); Brendan Kneafsey, Dublin (IE)

(73) Assignees: Henkel AG & Co. KGaA, Duesseldorf (DE); Henkel IP & Holding GmbH, Duesseldorf (DE)

( * ) Notice: Subject to any disclaimer, the term of this patent is extended or adjusted under 35 U.S.C. 154(b) by 670 days.

(21) Appl. No.: 14/299,325

(22) Filed: Jun. 9, 2014

(65) Prior Publication Data
US 2014/0284924 A1 Sep. 25, 2014

Related U.S. Application Data

(63) Continuation of application No. PCT/EP2012/073291, filed on Nov. 22, 2012.

(30) Foreign Application Priority Data

Dec. 9, 2011 (DE) ........................ 10 2011 088 123

(51) Int. Cl.
| B29C 65/48 | (2006.01) |
| B29C 65/00 | (2006.01) |
| C09J 4/06 | (2006.01) |
| C09J 133/06 | (2006.01) |
| F16L 47/02 | (2006.01) |
| C08J 5/12 | (2006.01) |
| C09J 5/00 | (2006.01) |
| B29L 23/00 | (2006.01) |
| B29C 65/52 | (2006.01) |

(52) U.S. Cl.
CPC .......... *B29C 65/485* (2013.01); *B29C 66/522* (2013.01); *B29C 66/5229* (2013.01); *C08J 5/124* (2013.01); *C09J 4/06* (2013.01); *C09J 5/00* (2013.01); *C09J 133/066* (2013.01); *F16L 47/02* (2013.01); *B29C 65/526* (2013.01); *B29C 66/1122* (2013.01); *B29C 66/71* (2013.01); *B29C 66/712* (2013.01); *B29C 66/73921* (2013.01); *B29L 2023/22* (2013.01); *B29L 2023/225* (2013.01); *C08J 2433/06* (2013.01); *C09J 2433/00* (2013.01)

(58) Field of Classification Search
CPC ... B29C 65/485; B29C 65/526; B29C 66/522; B29C 66/5229; B29C 66/71; B29C 66/712; B29C 66/73921; B29C 66/1122; B29L 2023/225; B29L 2023/22; C09J 4/06; C09J 133/066; C09J 5/124; C09J 5/00; C09J 2433/00; C08J 5/124; C08J 2433/06

See application file for complete search history.

(56) References Cited

U.S. PATENT DOCUMENTS

| 3,276,929 A | 8/1961 | Ferch |
| 4,200,480 A | 4/1980 | Wolinski et al. |
| 5,003,016 A | 3/1991 | Boeder |
| 5,656,345 A | 8/1997 | Strand et al. |
| 7,816,453 B2 | 10/2010 | Osae et al. |

FOREIGN PATENT DOCUMENTS

| CN | 1835993 A | 9/2006 |
| CN | 101165133 A | 4/2008 |
| CN | 101238186 A | 8/2008 |
| EP | 0197481 A2 | 3/1986 |
| JP | 54141826 A | 11/1979 |
| JP | 60072971 A | 4/1985 |
| JP | 6195928 A | 5/1986 |
| JP | 08086388 A | 4/1996 |
| JP | 2001343094 A | 12/2001 |
| JP | 2003207087 A | 7/2003 |
| JP | 2003294174 A | 10/2003 |
| JP | 2011514501 A | 5/2011 |
| JP | 2011515528 A | 5/2011 |
| WO | 2009108751 A1 | 9/2009 |
| WO | 2011002876 A2 | 1/2011 |

OTHER PUBLICATIONS

International Search Report for PCT/EP2012/073291, 2 pages.
DIN EN ISO 14814.
DIN EN ISO 9311-2.
DIN EN ISO 1043-1.

*Primary Examiner* — Michael C Miggins
(74) *Attorney, Agent, or Firm* — Steven C. Bauman

(57) ABSTRACT

A process for the adhesive bonding of plastic pipes with and without a fitting by use of a (meth)acrylate adhesive and also corresponding pipe connections, are described.

20 Claims, No Drawings

PROCESS FOR THE ADHESIVE BONDING OF PLASTICS PIPES BY MEANS OF (METH)ACRYLATE ADHESIVE

The present invention relates to methods for cohesively (stoffschlüssigen) connecting plastic pipes as well as a pipe network of at least two plastic pipes.

When bonding plastic pipes, for example PVC pressure pipes, commonly used bonding agents comprise solid polymer that is dissolved in a suitable solvent or solvent system. The adhesion principle is based on the swelling, dissolution and diffusion characteristics of the solvent. The solvents diffuse into the base material, cause it to swell, and assisted by the dissolved incorporated polymer fraction, lead to the bonding of the components in the pressing operation. The solvents are desorbed over an ill-defined period, such that a homogeneous bond is achieved. This principle of pipe bonding technology is described e.g. in the European patent application EP 0 197 481 A2.

Although this pipe bonding technology yields very good results, there is a general effort to establish possibilities to manage without solvent-based bonding agents.

In the international patent application WO 2009/108751 A1 it is proposed against this background to connect PVC pipes with the aid of a room temperature curable adhesive that comprises a mixture of epoxy resin and curing agent, containing a blend of polyamide and polyamine.

The concern of the present invention was to provide a pipe network that does not require the use of solvent-based bonding agents and in addition has an improved strength, in particular shear strength, of the adhesive bond.

In this regard it was surprisingly found that in methods for cohesively connecting plastic pipes, with or without fittings, the use of (meth)acrylate adhesives affords very good results.

Accordingly, a first subject matter of the invention is a method for cohesively connecting plastic pipes by means of a fitting,
wherein
(a) an adhesive is applied onto the joining surface of the fitting and/or onto the joining surfaces of the pipe ends to be connected therewith, and then
(b) the pipes and fitting are slid together, and then
(c) the adhesive is allowed to cure,
characterized in that a (meth)acrylate adhesive is used as the adhesive.

According to a preferred embodiment, in particular in step (a), an adhesive is applied both onto the joining surface of the fitting as well as onto the joining surfaces of the pipe ends to be connected therewith.

The term "fitting" refers to the connecting pieces of a pipeline. These connection pieces enable e.g. the (particularly straight) connection of pipe sections, but also pipe connections for a change of direction or change of diameter as well as the connection to component parts. In particular, the use of fittings enables the pipeline routing to be easily adapted to the external conditions, including e.g. circumventing obstacles, installing branches and changes of diameter etc. The route of a pipeline can thus be easily adapted to the constructional requirements. The term "fitting" is commonly used everywhere in pipeline planning as well as in installation technology. In the context of the invention, plastic fittings are preferably employed.

Furthermore, a second subject matter of the present invention is a method for cohesively connecting plastic pipes, wherein the pipe connection is achieved by sliding a first pipe end together with a second pipe end, wherein the one pipe end represents a receiving pipe part and the other pipe end represents an insertion pipe part,
wherein prior to sliding the pipe ends together, an adhesive is applied onto at least one (in particular on both) of the joining surfaces to be connected together, and after the pipe ends have been slid together, the adhesive is allowed to cure, characterized in that a (meth)acrylate adhesive is used as the adhesive.

The method according to the invention offers a series of advantages. Firstly, permanently stable, high strength pipe connections are enabled, which have a lifetime that corresponds to the lifetime of a pipe, and which meet the quality and verification requirements that apply in particular to pressure pipelines. The bonded connection achieved by means of the method according to the invention has a very good light resistance, a very good solvent resistance, a very good resistance to hydrolysis, very good resistance to high and low temperatures and a very good impact resistance. In particular, a very good shear strength of the bonded connection is achievable. In the context of the present invention, the shear strength can be tested in particular according to DIN EN ISO 9311-2. This standard defines a method for the characterization of adhesives for thermoplastic pipeline systems, in that the shear strength of a bonded jointed connection is determined on an appropriately prepared sample. A particular advantage of the connection technology according to the invention is a particularly rapid strength build-up under usual curing conditions (e.g. at room temperature 20° C.), in particular in regard to the shear strength, thereby enabling plants to be started up more quickly. The adhesive can be applied without problem, e.g. by static mixers. The two methods according to the invention differ only in that in the first method the pipes are connected together with fittings, and in the second method the pipes are connected directly together.

In principle, the adhesive can be applied in all possible ways in the method according to the invention. However, the adhesive is preferably applied with the aid of an application tool, in particular by brush coating. This enables a particularly uniform application in the desired adequate thickness.

The adhesive is allowed to cure particularly at ambient temperature that, depending on the climatic situation, is preferably about 10 to 35° C., for example 20° C. A very good strength of the bonded connection is achieved already after one hour.

In order to achieve a particularly good bonding of the plastic pipes, with or without fittings, in the context of the invention, then in the context of a preferred embodiment of the invention, it is advantageous if the adhesive film thickness on the joining surface before assembly is in the range 0.1 mm to 3 mm, preferably 0.2 mm to 1.5 mm, particularly 0.2 mm to 0.6 mm. These adhesive film thicknesses in connection with the employed (meth)acrylate adhesive afford pipe bonds with a quite particularly long service life. Surprisingly, due to the good lubricating effect of the adhesive, diameter gaps of −0.2 mm could also be joined.

In the context of the invention, the bonding connection between the joining surfaces is effected by sliding pipe and fitting or pipe and pipe together. In order to be able to produce a quite particularly permanently secure pipe connection, the method according to the invention is advantageously carried out in the context of a preferred embodiment, such that pipe and fitting or pipe and pipe are slid together without twisting.

In fact, outstandingly permanently secure pipe connections can also be produced in the context of the present invention if pipe and fitting or pipe and pipe are slid together with twisting, because a particular advantage of the present invention is that the inventively employed (meth)acrylate adhesives have a comparatively long open time (compared with solvent-based adhesives) and therefore also allow corrections or twisting when pipe and fitting or pipe and pipe are slid together, although even still better results are obtained when twisting is avoided. In addition, the comparatively long open time enables the problem-free bonding of large diameter pipes, i.e. with diameters greater than 400 mm.

The method according to the invention is fundamentally suitable for securely bonding all types of plastic pipes. According to a particular embodiment of the invention, the plastic pipes to be connected concern those based on thermoplastic polymers, in particular based on PVC (preferably PVC-U or PVC-C), ABS (acrylonitrile-butadiene-styrene copolymer), ASA (acrylic ester-styrene-acrylonitrile copolymer), ABS/ASA, and/or PET (polyethylene terephthalate). The fittings are likewise preferably based on thermoplastic polymers, in particular based on those cited above.

PVC-C is the abbreviation according to DIN EN ISO 1043-1: 2002-06 for chlorinated polyvinyl chloride. Chlorinated polyvinyl chloride can be manufactured by chlorinating polyvinyl chloride (PVC) in fluidized bed processes, dispersion processes or solution processes and is usually marketed as a colorless powder with a chlorine content of ca. 62-73% and a density of ca. 1.5-1.58 g/cm$^3$. The chlorination increases in particular the thermal stability and heat deformation resistance of the polyvinyl chloride.

PVC-U is the abbreviation according to DIN EN ISO 1043-1: 2002-06 for rigid PVC that can have plasticizer contents of 0-12 wt %. Plastic pipes based on PVC-U to be bonded according to the invention are in particular free of plasticizer. In contrast, flexible PVC has plasticizer contents of >12 wt %.

The inventive use of the (meth)acrylate adhesive, particularly with the abovementioned plastic pipes based on thermoplastic polymers, affords pipe connections of excellent quality and permanent toughness.

A particular advantage of the present invention is that the joining parts to be connected may also consist of different plastic materials, and permanently secure pipe connections are enabled nevertheless. Thus another preferred embodiment of the present invention corresponds to when the joining parts consist of different plastic materials.

Another particular advantage of the present invention is that it enables a bonded connection that minimizes or even obviates the need for solvent.

The bonding principle of the usual bonding agents for pipe bonding is frequently based on, as illustrated in the introduction, the swelling, dissolution and diffusion behavior of the employed solvent.

In contrast, it is inventively preferred when the employed adhesive comprises less than 10 wt %, preferably less than 5 wt %, particularly less than 2 wt % or even no solvent. A reduced solvent fraction serves not least the occupational health and safety. In the context of the invention, reactive monomers are not solvents in the scope of the invention.

The inventively employed adhesive is a (meth)acrylate adhesive.

In the context of this invention, (meth)acrylate adhesives are adhesives that comprise acrylic acid and/or methacrylic acid and/or their esters. They particularly concern two-component adhesives. Particularly preferred (meth)acrylate adhesives in the context of this invention are two-component reactive adhesives that comprise methacrylic acid esters, in particular methacrylic acid methyl ester (methyl methacrylate). In this regard, those (meth)acrylate adhesives are preferred, in which the reactive monomer system comprises at least 10 wt % methyl methacrylate, preferably at least 20 wt % methyl methacrylate, in particular at least 30 wt % methyl methacrylate, each wt % relative to the total reactive monomer system. Furthermore, those (meth)acrylate adhesives are preferred, in which the reactive monomer system comprises at least 40 wt % methyl methacrylate, preferably at least 50 wt % methyl methacrylate, in particular at least 60 wt % methyl methacrylate, each wt % relative to the total reactive monomer system.

The monomers employed in the (meth)acrylate adhesive, such as in particular the methyl methacrylate, can be polymerized by a radical chain reaction.

In order to initiate the polymerization reaction a reactive radical is needed, which is mainly afforded by a peroxide when an accelerator is added to it. Suitable peroxides, such as e.g. dibenzoyl peroxide, and suitable accelerators, such as e.g. tertiary aromatic amines, such as in particular dimethyl-p-toluidine, are known per se.

The (meth)acrylate system can be processed in that e.g. a first component A comprises at least one polymerizable monomer component based on (meth)acrylate, and a curing agent, and a second component B comprises at least one polymerizable monomer component based on (meth)acrylate, and a catalytic component for catalyzing the curing reaction (the so-called accelerator). The components A and B can be mixed in the required proportions prior to application onto the joining parts and then dosed onto the joining parts. The mixing is particularly effected in a static mixer. Still, it is also possible to apply the components directly onto the joining parts and to realize the necessary mixing through the contact pressure on the joining parts; this is particularly advantageous in regard to the method according to the invention, because it is labor-saving.

In principle, the at least one polymerizable monomer component based on (meth)acrylate can comprise any monomer component that is suitable for use in the (meth) acrylate adhesives, in particular comprising acrylic acid and/or methacrylic acid and/or their esters. Methyl methacrylate is preferably comprised. Polymerizable monomer components based on (meth)acrylate are preferably comprised in a total amount of 30-80 wt %, relative to the total adhesive composition.

The monomer system preferably comprises methyl methacrylate. The methyl methacrylate is preferably comprised in amounts of 20-70 wt %, particularly 30-60 wt %, relative to the total adhesive composition.

Moreover, other esters of methacrylic acid or acrylic acid can preferably be additionally employed, e.g. hydroxyethyl methacrylate and/or hydroxypropyl methacrylate, preferably in a total amount of 5-50 wt %, particularly 10-30 wt %, relative to the total adhesive composition.

Moreover, other acidic monomers can be additionally employed, in particular methacrylic acid, preferably in a total amount of 0.5-10 wt %, particularly 1-5 wt %, relative to the total adhesive composition. The addition of the acidic monomer, in particular methacrylic acid, combined with the other ingredients of the adhesive, particularly improves the heat deformation resistance of the pipe bond, but also the curing behaviour and also the adhesion properties to the pipe materials as well as the tensile strength. The use of methacrylic acid is therefore associated with great advantages for the invention and therefore corresponds to a particularly preferred embodiment of the invention.

In the total composition, i.e. in the total (meth)acrylate two-component system, preferably (i) at least three different polymerizable monomer components based on (meth)acrylate are employed, comprising
a) methyl methacrylate, in amounts of 20-70 wt %, relative to the total composition,
b) methacrylate with polar groups, selected from cyclohexyl methacrylate, tetrahydrofurfuryl methacrylate, hydroxyethyl methacrylate, hydroxypropyl methacrylate, t-butylaminoethyl methacrylate, cyanoethyl methacrylate, and chloroethyl methacrylate, in particular, however, hydroxyethyl methacrylate and/or hydroxypropyl methacrylate, in amounts of 5-30 wt %, relative to the total composition,
and
(c) an acidic monomer component, in particular methacrylic acid, in amounts of 0.5-10 wt %, relative to the total composition.

A particularly preferred example of a methacrylate with polar groups is the hydroxyethyl methacrylate monomer that is available e.g. as Mhoromer BM 905 from Evonik.

In a further preferred embodiment, the total composition comprises
a) methyl methacrylate in amounts of 30-60 wt %,
b) hydroxyethyl methacrylate and/or hydroxypropyl methacrylate in a total amount of 5-15 wt %,
c) methacrylic acid in amounts of 0.5 to 10 wt %, preferably 1-5 wt %,
d) one or more components for improving the impact resistance, in particular including chlorosulfonated and/or styrene-acrylonitrile-butadiene copolymer, in a total amount of 5 to 70 wt %, preferably 10 to 60 wt %,
e) peroxide based-curing agents in a total amount of 0.1 to 5 wt %,
f) catalytic component(s) for catalyzing the curing reaction, preferably in a total amount of 0.01 to 5 wt %,
g) stabilizer in a total amount of 0.1 to 15 wt %,
h) optionally thickeners, preferably fumed silica, preferably in a total amount of 0.1 to 30 wt %,
wherein each wt % indication is relative to the total composition.

Of course, all inventively employable (meth)acrylate adhesives can comprise additional optional components, depending on requirements.

Within the framework of another preferred embodiment, di or higher functional monomers can be additionally employed as the polymerizable monomer components, such as e.g. ethylene glycol dimethacrylate, propylene glycol dimethacrylate and/or 1,1,1-trimethylolpropane trimethacrylate. This improves in particular the heat deformation resistance of the pipe bonding. The total amount of such di or higher functional monomers can be e.g. 0 to 20 wt %, preferably 0.1 to 10 wt %, in particular 0.1 to 5 wt %, relative to the total composition.

Peroxides, hydroperoxides, peroxy esters, peroxy salts, peroxy acids and/or mixtures thereof come into consideration as the peroxide-based curing agents. Hydroperoxides such as e.g. cumene hydroperoxide or diisopropylbenzene hydroperoxide are particularly preferred. Cumene hydroperoxide is most preferred. tert-Butyl hydroperoxide (TBH), tert-butyl perbenzoate (TBPB) and benzoyl peroxide (BPO) for example are also suitable. Typically, they are suitably employed in a total quantity of about 0.5 wt % to 3 wt % of the total composition.

The addition of stabilizers, such as e.g. products based on sterically hindered phenols, hydroquinones or quinones, prevents an unwanted premature initiation of radical chain reactions and increases the storage stability of the composition.

Preferred stabilizers that can be comprised in both components are selected, independently of one another, from thiazines, hydroquinones, quinones, sterically hindered phenols (e.g. 2,6-di-tert-butyl-4-methylphenol), organic acids and compounds that possess an oxazole functionality. However, the use of hydroquinones and sterically hindered phenols is particularly preferred. The total amount of the stabilizers can be in the range of e.g. 0.1 to 10 wt %, relative to the total composition.

Substances that can catalyze the decomposition of the curing agent, in particular the peroxide to radicals, can be employed as the catalytic components for catalyzing the curing reaction. Tertiary amines, such as e.g. N,N-dimethyl-p-toluidine, N,N-dihydroxyethyl-p-toluidine, dimethylaniline, diethylaniline, N,N-diethyl-p-toluidine and combinations thereof are suitable.

Imines are also suitable, such as e.g. the imine from butanal and aniline. Dihydropyridine derivatives, such as e.g. 3,5-diethyl-1,2-dihydro-1-phenyl-2-propylpyridine, are likewise suitable. Transition metal salts, for example copper and/or cobalt salts, such as copper octanoate, which are preferably soluble in organic media, can likewise be employed. It is particularly preferred to employ a transition metal salt in combination with a tertiary amine, an imine or dihydropyridine derivative as the catalytic components to catalyze the curing reaction. The suitable total amount of the catalytic component(s) for catalyzing the curing reaction is preferably in the range 0.01 to 5 wt %, relative to the total composition.

Components for improving the impact resistance (so-called "tougheners") are in particular elastomers, preferably chlorosulfonated polyethylene (so-called "Hypalon®" from DuPont). Chlorosulfonated polyethylene can be comprised e.g. preferably in amounts of 5-50 wt %, in particular 10-30 wt %, in the total composition.

Chlorosulfonated polyethylene can be manufactured e.g. by the simultaneous treatment of polyethylene with chlorine and sulfur dioxide. Commercially available chlorosulfonated polyethylene types comprise ca. 25-45% chlorine and 0.8-1.5% sulfur.

Preferred employable components for improving the impact resistance (so-called "tougheners") are in particular also styrene-acrylonitrile-butadiene copolymers (such as e.g. Blendex 338 from Chemtura), abbreviated to ABS copolymers. ABS copolymers belong to the group of the elastomer-modified thermoplastics. The inventively employable ABS copolymers preferably concern thermoplastic and elastomeric polymer blends, whose discontinuous, elastomeric phase of homopolymers or copolymers of buta-1,3-diene is dispersed in a continuous phase of rigid, thermoplastic styrene-acrylonitrile copolymers. Styrene-acrylonitrile-butadiene copolymers can be comprised for example in amounts of preferably 5-50 wt %, in particular 10-30 wt %, in the total composition.

In principle, any suitable component can be employed in the present invention to improve the impact resistance. In particular, the component to improve the impact resistance of the present invention can be selected from a plurality of elastomeric materials. Polyacrylate, styrene/butadiene/styrene (SBS) copolymer, styrene/isoprene/styrene (SIS) copolymer or styrene/butadiene copolymer can be employed for example. Further suitable elastomers are selected from the group consisting of acrylate-butadiene copolymer, butadiene, chloroprene, ethylene-propylene, ethylene-propylene-diene, isoprene, isobutylene, isobutylene-isoprene (butyl rubber), styrene-butadiene, styrene-isoprene, acrylonitrile-butadiene, acrylonitrile-chloroprene, vinyl pyridine-butadiene, vinyl pyridine-styrene-butadiene, chloroisobutylene-isoprene (chlorobutyl rubber), bromoisobutylene-isoprene (bromobutyl rubber), dialkysiloxane, polypropylene oxide, polyester urethane polyether urethane as well as their mixtures. Moreover, reactive liquid polymers can be employed. Reactive liquid polymers comprise functional groups, generally on their terminal ends, and react in situ with the resin to form elastomeric domains. Exemplary reactive liquid polymers are carboxy-terminated butadiene nitrile (CTBN), amine-terminated butadiene nitrile (ATBN), hydroxy-terminated butadiene nitrile (HTBN), epoxy-terminated butadiene nitrile (ETBN), mercapto-terminated butadiene nitrile (MTPN) and phenoxy-terminated butadiene nitrile (PTBN).

Particularly useful components for improving the impact resistance are certainly chlorosulfonated polyethylene, styrene-acrylonitrile-butadiene copolymers (such as e.g. Blendex 338 from Chemtura) and/or nitrile rubber.

Most preferred are chlorosulfonated polyethylenes, such as for example Hypalon 20 or Hypalon 30 from DuPont, as well as styrene-acrylonitrile-butadiene copolymers (such as e.g. Blendex 338 from Chemtura), wherein it is preferred to employ a combination of chlorosulfonated polyethylenes and styrene-acrylonitrile-butadiene copolymers. In this way, particularly good strength values could be obtained for the pipe connection.

The employable total amount of the component(s) for improving the impact resistance can preferably be in the range 5-70 wt %, in particular 10-60 wt %, relative to the total composition.

A curable (meth)acrylate adhesive that is preferably employable in the context of the invention comprises:
a first component, comprising:
(i) at least one polymerizable monomer component based on (meth)acrylate, preferably comprising methyl methacrylate,
(ii) curing agent, preferably based on peroxide,
(iii) stabilizer and
a second component, comprising:
(i) at least one polymerizable monomer component based on (meth)acrylate, preferably comprising methyl methacrylate,
(ii) catalyst component for catalyzing the curing reaction,
(iii) stabilizer.

The polymerizable monomers of the first component are preferably present in amounts of 20 to 60 wt %, in particular 30 to 50 wt % of the total weight of the first component.

The curing agent, in particular based on peroxide, of the first component is preferably present in amounts of 0.1 to 5 wt %, in particular 0.2 to 4 wt % of the total weight of the first component.

The stabilizer of the first component is preferably present in amounts of 0.1 to 5 wt %, in particular 0.2 to 4 wt % of the total weight of the first component.

The polymerizable monomers of the second component are preferably present in amounts of 10 to 90 wt %, in particular 30 to 80 wt % of the total weight of the second component.

The catalytic component of the second component is preferably present in amounts of 0.01 to 5 wt %, in particular 0.02 to 4 wt % of the total weight of the second component.

The stabilizer of the second component is preferably present in amounts of 0.01 to 5 wt %, in particular 0.02 to 4 wt % of the total weight of the second component.

A curable (meth)acrylate adhesive that is preferably employable in the context of the invention comprises: a first component, comprising:
(i) at least one polymerizable monomer component based on (meth)acrylate, preferably comprising methyl methacrylate, in a total amount of 20 to 60 wt %, relative to the first component,
(ii) peroxide based-curing agents in a total amount of 0.1 to 5 wt %, relative to the first component,
(iii) stabilizer in a total amount of 0.1 to 5 wt %, relative to the first component,
and
a second component, comprising:
(i) at least one polymerizable monomer component based on (meth)acrylate, preferably comprising methyl methacrylate, in a total amount of 10 to 90 wt %, relative to the second component,
(ii) catalytic component for catalyzing the curing reaction, in a total amount of 0.01 to 5 wt %, relative to the second component,
(iii) stabilizer in a total amount of 0.1 to 5 wt %, relative to the second component.

Another curable (meth)acrylate adhesive that is preferably employable in the context of the invention comprises:
a first component, comprising:
(i) methyl methacrylate in amounts of 20 to 60 wt %, relative to the first component,
(ii) peroxide based-curing component in a total amount of 0.1 to 5 wt %, relative to the first component,
(iii) stabilizer in a total amount of 0.1 to 5 wt %, relative to the first component,
(iv) component for improving the impact resistance (so-called "toughener") in a total amount of 5 to 50 wt %, relative to the first component,
(v) preferably a thickener in a total amount of 0.5-20 wt %, relative to the first component,
(vi) methacrylic acid in amounts of 0.5 to 10 wt %, preferably 1-5 wt %, relative to the first component,
and
a second component, comprising:
(i) methyl methacrylate in amounts of 10 to 90 wt %, relative to the second component,
(ii) catalytic component for catalyzing the curing reaction, in a total amount of 0.01 to 5 wt %, relative to the second component,
(iii) stabilizer in a total amount of 0.1 to 5 wt %, relative to the second component,
(iv) component for improving the impact resistance (so-called "toughener") in a total amount of 5 to 50 wt %, relative to the second component,
(v) preferably a thickener in a total amount of 0.5-20 wt %, relative to the second component. In this regard, a methacrylate with polar groups, in particular hydroxyethyl methacrylate and/or hydroxypropyl methacrylate, is preferably comprised in at least one of the two components, in particular in the first component, in particular in a total amount of 5-15 wt %, relative to the component in question.

Fumed silica is particularly suitable as the thickener.

The inventively employable (meth)acrylate adhesives can comprise, as needed, additional optional components, for example an optional dye component.

Chelating agents can likewise be employed in the (meth)acrylate adhesives, in particular for the control and prevention of premature peroxide decomposition and polymerization, as well as to remove traces of metallic impurities. A particularly preferred chelating agent is the tetrasodium salt of ethylenediaminetetraacetic acid (EDTA). Useful total amounts of chelating agent, in particular EDTA, are typically in the range of 0.01 wt % to 5 wt % of the total composition. In particular, the chelating agent, in particular EDTA, can be comprised in a total amount of 0.02 wt % to 3 wt % of the total composition.

Organic acids can be used in the present invention. Exemplary suitable organic acids are carboxylic acids. Suitable carboxylic acids are for example maleic acid as well as fumaric acid.

The useful total amount of the optional organic acid is generally in the range of preferably 0 wt % to 9 wt %, relative to the total composition. For example, the organic acid can be comprised in a total amount of 0.1 wt % to 5 wt %, relative to the total composition.

A preferable employable curable two-component (meth) acrylate adhesive in the context of the invention comprises in the total composition
a) methyl methacrylate in amounts of 30-60 wt %,
b) hydroxyethyl methacrylate and/or hydroxypropyl methacrylate in a total amount of 5-15 wt %,
c) methacrylic acid in amounts of 0.5 to 10 wt %, preferably 1-5 wt %,
d) one or more components for improving the impact resistance, in particular including chlorosulfonated polyethylene and/or styrene-acrylonitrile-butadiene copolymer, in a total amount of 5 to 70 wt %, preferably 10 to 60 wt %,
e) peroxide based-curing agents in a total amount of 0.1 to 5 wt %,
f) catalytic component(s) for catalyzing the curing reaction, preferably in a total amount of 0.01 to 5%,
g) stabilizer in a total amount of 0.1 to 15 wt %,
h) optionally thickeners, preferably fumed silicas, preferably in a total amount of 0.1 to 30 wt %,
wherein each wt % indication is relative to the total composition,
wherein the total composition is divided into two components (a) and (b), a first component (a), comprising:
(i) methyl methacrylate in amounts of 20 to 60 wt %, relative to the component (a),
(ii) peroxide based-curing component in a total amount of 0.1 to 5 wt %, relative to the component (a),
(iii) stabilizer in a total amount of 0.1 to 5 wt %, relative to the component (a),
(iv) component for improving the impact resistance (so-called "toughener") in a total amount of 5 to 50 wt %, relative to the component (a),
(v) preferably a thickener in a total amount of 0.5-20 wt %, relative to the component (a),
(vi) methacrylic acid in amounts of 1-5 wt %,
as well as a second component (b), comprising:
(i) methyl methacrylate in amounts of 10 to 90 wt %, relative to the component (b),
(ii) catalytic component for catalyzing the curing reaction, in a total amount of 0.01 to 5 wt %, relative to the component (b),
(iii) stabilizer in a total amount of 0.1 to 5 wt %, relative to the component (b),
(iv) component for improving the impact resistance (so-called "toughener") in a total amount of 5 to 50 wt %, relative to the component (b),
(v) preferably a thickener in a total amount of 0.5-20 wt %, relative to the component (b).

In this regard, the hydroxyethyl methacrylate and/or hydroxypropyl methacrylate is preferably comprised in the component (a) namely in a total amount of 5-15 wt %, relative to the component in question.

Furthermore, it is possible for the composition according to the invention to optionally comprise a so-called open time extender, in particular based on wax, preferably in both components of the total composition. Open time extenders serve to extend the open time and are known per se to the person skilled in the art. Each suitable open time extender can be optionally comprised in the compositions according to the invention. Suitable open time extenders include a series of various waxes, wherein paraffin wax such as for example "IGI 1977" from the International Group is preferred. Useful amounts of the optional open time extender are typically in the range of 0.1 wt % to 3 wt %, preferably 0.2 wt % to 1.5 wt %, relative to the total composition.

According to another preferred embodiment, the inventively used plastic pipes concern pressure pipes. Pressure pipes are known per se to the person skilled in the art and are employed in pressure pipelines. In contrast to an open-channel line, a pipeline, in which a higher pressure than atmospheric pressure prevails, is called a pressure pipeline. Pressure-less applications, i.e. gravity lines or open-channel lines, can of course, likewise be inventively realized.

The pipe connections that can be inventively provided are particularly employable for transporting water, however, other media can of course also be transported, such as e.g. glycol mixtures that are used for example as coolants. However, the transport of water is particularly preferred.

According to a preferred embodiment, the pipe connections according to the invention are consequently particularly employed for potable water lines, industrial water lines, and/or for pressure drainage.

The methods according to the invention for cohesively connecting plastic pipes afford pipe networks of at least two plastic pipes.

A further subject matter of the present invention is consequently a pipe network made up of at least two plastic pipes with or without a fitting insert between the pipe ends, suitable in particular for potable water lines, industrial water lines, and/or for pressure drainage, characterized in that the joined surfaces of the joined parts connected to one another are attached with a two-component (meth)acrylate adhesive.

EXAMPLE

The shear strength of bonded PVC-U pipe connections was tested according to DIN EN ISO 9311-2. According to DIN EN 14814 the minimum requirement for the shear strength of the pipe connection at a test temperature of 23° C., 1 h after bonding is 0.4 MPa, 24 h after bonding 1.5 MPa and 480 h after bonding 7.0 MPa.

A 75 mm long pipe section (material: PVC-U; 40 mm external diameter) was firstly bonded with an inventive 2-component (meth)acrylate adhesive to a fitting made of the same material over a length of 20 mm, and the shear strength of the connection was subsequently tested according to DIN EN ISO 9311-2. The inventively employed 2-component (meth)acrylate adhesive had the following frame formulation:
a) methyl methacrylate in an amount of 30-60 wt %,
b) hydroxyethyl methacrylate in an amount of 5-15 wt %,
c) methacrylic acid in an amount of 1-5 wt %,
d) components for improving the impact resistance in a total amount of 10 to 60 wt %,
e) peroxide based-curing agents in an amount of 0.1 to 5 wt %,
f) catalytic component for catalysing the curing reaction in an amount of 0.01 to 5 wt %,
g) stabilizer in a total amount of 0.1 to 15 wt %,
h) thickener in an amount of 0.5-20 wt %, wherein each wt % indication is relative to the total composition.

The shear strength of the connection determined according to DIN EN 14814 at a test temperature of 23° C., 1 h after bonding was 5.0 MPa, 24 h after bonding 16 MPa and 480 h after bonding 20.0 MPa. The final strength value can be taken as the 480 h value. Consequently, the invention already after 24 h enables a strength that is more than double that required by DIN EN 14814. Already after 1h the connection exhibits a very high strength that is a multiple of the 24 h requirement of DIN EN 14814.

In comparison, the same experiment was repeated, wherein this time a conventional solvent-based adhesive for PVC-U pipes was employed instead of the inventive 2-component (meth)acrylate adhesive. The shear strength of the bonded connection determined according to DIN EN 9311-2 1 h after bonding was 0.8 MPa, 24 h after bonding 2.5 MPa and 480 h after bonding 13 MPa. The bonding technology according to the invention is consequently clearly far superior in all respects to that based on the conventional solvent-based adhesive in regard to the obtained strength of the connection as well as the speed of the bonding effect.

What is claimed is:

1. A method for cohesively connecting plastic pipes to a fitting, comprising the steps of:
   (a) applying a (meth)acrylate-containing adhesive onto at least one joining surface of the fitting and/or onto at least one joining surface of the pipe ends to be connected without swelling or dissolution of at least one joining surface therewith,
   (b) sliding together the pipes and fitting, and
   (c) allowing the adhesive to cure between the joining surface(s).

2. A method for cohesively connecting plastic pipes according to claim 1, wherein the pipe connection is achieved by joining a first pipe end together with a second pipe end, wherein one pipe end represents a receiving pipe part and the other pipe end represents an insertion pipe part, wherein prior to sliding the pipe ends together, an adhesive is applied onto at least one of the joining surfaces to be connected together, and after the pipe ends have been slid together, the adhesive is allowed to cure.

3. The method according to claim 1, characterized in that the adhesive is applied by an application tool, in particular by brush coating.

4. The method according to claim 1, characterized in that the adhesive film thickness on the joining surface before assembly ranges from 0.1 mm to 3 mm.

5. The method according to claim 1, characterized in that the pipe and fitting or pipe and pipe are slid together without twisting.

6. The method according to claim 1, wherein the plastic pipes are made from thermoplastics.

7. The method according to claim 1, wherein the parts to be joined are made of different plastic materials.

8. The method according to claim 1, wherein the adhesive comprises less than 10 wt % solvent.

9. The method according to claim 1, wherein the plastic pipes are pressure pipes.

10. The method according to claim 1, wherein the pipe connection is used for one or more of potable water lines, industrial water lines, or for pressure drainage.

11. The method according to claim 1, wherein the adhesive comprises at least 40 wt % methyl acrylate.

12. The method according to claim 1, wherein the adhesive comprises at least 50 wt % methyl acrylate.

13. The method according to claim 1, wherein the adhesive comprises at least 60 wt % methyl acrylate.

14. The method according to claim 1, wherein the adhesive comprises at least 70 wt % methyl acrylate.

15. The method according to claim 1, wherein the adhesive comprises at least 90 wt % methyl acrylate.

16. The method according to claim 1, wherein the adhesive comprises less than 10 wt %, less than 5 wt %, less than 2 wt %, or no solvent.

17. The method according to claim 1, wherein the (meth) acrylate containing adhesive comprises:
   a) methyl methacrylate in quantities of 30 to 60 wt %,
   b) hydroxyethyl methacrylate, hydroxypropyl methacrylate or combinations thereof in a quantity of 5 to 15 wt %,
   c) methacrylic acid in quantities of 0.5 to 10 wt %,
   d) one or more tougheners,
   e) a peroxide-based curing agent in a quantity of 0.1 to 5 wt %,
   f) a catalyst, and
   g) stabilizer in a quantity of 0.1 to 15 wt %, and
   h) optionally thickening agents,
   wherein the "wt %" indication is based in each case on the overall composition.

18. The method according to claim 17, wherein the composition of the (meth)acrylate-containing adhesive is in a two part format in which, a first component (a) comprises:
   (i) methyl methacrylate in quantities of 20 to 60 wt %, based on component (a),
   (ii) a peroxide-based curing component in a quantity of 0.1 to 5 wt %, based on component (a),
   (iii) stabilizer in a quantity of 0.1 to 5 wt %, based on component (a),
   (iv) a toughener in a quantity of 5 to 50 %, based on component (a),
   (v) a thickening agent in a quantity of 0.5 to 20 wt %, based on component (a), and
   (vi) methacrylic acid in quantities of 1 to 5 wt %, based on component (a), and a second component (b) comprises:
   (i) methyl methacrylate in quantities of 10 to 90 wt %, based on component (b),
   (ii) a catalyst in a total quantity of 0.01 to 5 wt %, based on component (b),
   (iii) a stabilizer in a quantity of 0.1 to 5 wt %, based on component (b),
   (iv) a toughener in a quantity of 5 to 50 wt %, based on component (b), and
   (v) a thickening agent in a quantity of 0.5 to 20 wt %, based on component (b).

19. A pipe network made up of at least two plastic pipes with or without a fitting insert between the pipe ends, suitable for potable water lines, industrial water lines, and/or for pressure drainage, wherein the joined surfaces of the joined parts connected to one another are attached with a (meth)acrylate-containing adhesive without swelling or dissolution of the joined surfaces.

20. The pipe network according to claim 19, wherein the (meth)acrylate-containing adhesive comprises
   a) methyl methacrylate in quantities of 30 to 60 wt %,
   b) hydroxyethyl methacrylate, hydroxypropyl methacrylate or combinations thereof in a quantity of 5 to 15 wt %,
   c) methacrylic acid in quantities of 0.5 to 10 wt %,
   d) one or more tougheners to impact resistance improving components, e) a peroxide-based curing agent in a quantity of 0.1 to 5 wt %,
f) a catalyst, and
g) stabilizer in a quantity of 0.1 to 15 wt %, and
h) optionally thickening agents,
wherein the "wt %" indication is based in each case on the overall composition.

\* \* \* \* \*

UNITED STATES PATENT AND TRADEMARK OFFICE
CERTIFICATE OF CORRECTION

PATENT NO.         : 9,868,250 B2
APPLICATION NO.    : 14/299325
DATED              : January 16, 2018
INVENTOR(S)        : Bernd Beuer, Bernhard Schoettmer and Brendan Kneafsey Page 1 of 1

It is certified that error appears in the above-identified patent and that said Letters Patent is hereby corrected as shown below:

In the Specification

Column 9, Line 29: Change "5%" to -- 5 wt % --.

Signed and Sealed this
Ninth Day of July, 2019

Andrei Iancu
*Director of the United States Patent and Trademark Office*